(12) United States Patent
Jeong et al.

(10) Patent No.: US 8,860,770 B2
(45) Date of Patent: Oct. 14, 2014

(54) METHOD OF DRIVING A DISPLAY PANEL AND A DISPLAY APPARATUS PERFORMING THE METHOD

(75) Inventors: Yong-Ju Jeong, Asan-si (KR); Jong-Hee Na, Asan-si (KR); Young-Min Choi, Hwaseong-si (KR); Jae-Kil Lee, Cheonan-si (KR); Seung-Kuk Yun, Ansan-si (KR); Ji-Eun Jang, Asan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 303 days.

(21) Appl. No.: 13/242,098

(22) Filed: Sep. 23, 2011

(65) Prior Publication Data

US 2012/0256977 A1  Oct. 11, 2012

(30) Foreign Application Priority Data

Apr. 6, 2011  (KR) ........................ 10-2011-0031464

(51) Int. Cl.
```
G09G 5/10     (2006.01)
G09G 5/02     (2006.01)
H04N 13/04    (2006.01)
G09G 3/00     (2006.01)
```
(52) U.S. Cl.
CPC ....... *H04N 13/0497* (2013.01); *H04N 13/0454* (2013.01); *G09G 3/00* (2013.01)

USPC ........................................... 345/691; 345/694

(58) Field of Classification Search
None
See application file for complete search history.

(56) References Cited

U.S. PATENT DOCUMENTS

| 7,224,340 B2 | 5/2007 | Pai et al. | |
|---|---|---|---|
| 2011/0234605 A1* | 9/2011 | Smith et al. | 345/522 |

FOREIGN PATENT DOCUMENTS

| KR | 2005-0008978 | 1/2005 |
|---|---|---|
| KR | 2005-0045097 | 5/2005 |
| KR | 1020060089829 | 8/2006 |

* cited by examiner

*Primary Examiner* — Joe H Cheng
*Assistant Examiner* — Kwin Xie
(74) *Attorney, Agent, or Firm* — F. Chau & Associates, LLC

(57) ABSTRACT

A method of driving a display panel includes driving a first sub area and a second sub area of a pixel part in a two-dimensional (2D) image mode, wherein a first luminance difference exists between the first and second sub areas in the 2D image mode, and driving the first sub area and the second sub area of the pixel part in a three-dimensional (3D) image mode, wherein a second luminance difference exists between the first and second sub areas in the 3D image mode, the second luminance difference being smaller than the first luminance difference.

23 Claims, 10 Drawing Sheets

METHOD OF DRIVING A DISPLAY PANEL AND A DISPLAY APPARATUS PERFORMING THE METHOD

CROSS-REFERENCE TO RELATED APPLICATION

This application claims priority under 35 U.S.C. §119 to Korean Patent Application No. 10-2011-0031464, filed on Apr. 6, 2011 in the Korean Intellectual Property Office (KIPO), the disclosure of which is incorporated by reference herein in its entirety.

BACKGROUND

1. Technical Field

The present invention relates to a method of driving a display panel and a display apparatus performing the method. More particularly, the present invention relates to a method of driving a display panel to improve a display quality of a 3D stereoscopic image and a display apparatus for performing the method.

2. Discussion of the Related Art

Generally, a liquid crystal display (LCD) device displays a two-dimensional (2D) image. Recently, three-dimensional (3D) image display technology has seen increased application in a variety of fields such as photography, video games, movies, television and the like. Accordingly, an LCD device capable of displaying a 3D stereoscopic image has been developed.

Generally, such 3D LCD device allows a viewer to feel the depth (e.g., the 3D effect) of an object by using binocular parallax. Binocular parallax may exist due to the eyes of a person being spaced apart from each other by a predetermined distance, and thus, a 2D image viewed by the left eye is different from that viewed by the right eye. Thus, the person's brain blends the two different 2D images together to generate a 3D image that is a perspective and realistic representation of the object being viewed through the 3D LCD device.

Techniques for displaying the 3D stereoscopic image may be classified into a stereoscopic method and an auto-stereoscopic method, depending on whether 3D glasses are needed or not. The stereoscopic method uses glasses and may be classified as a passive polarized glasses type and an active shutter glasses type. In the passive polarized glasses type, the 3D stereoscopic image is displayed by a polarized filter having a polarizing axis for each of the eyes. In the active shutter glasses type, a left-eye image and a right-eye image are time-divided to be periodically displayed to a viewer who wears a pair of glasses which sequentially open or close a left-eye shutter and a right-eye shutter in respective synchronization with the periods of the left and right-eye images.

The passive polarized glasses type may, however, decrease a luminance value of the 3D stereoscopic image due to the polarized filter dividing the left-eye image and the right-eye image. In addition, in the active shutter glasses type, when a liquid crystal (LC) response time of the shutter glasses is improved, a crosstalk between the left-eye image and the right-eye image is reduced. However, the LC's response time has physical limitation. For example, LC can be slow to respond to an external field. To speed the LC's response time and still achieve the reduction in crosstalk, the backlight of a 3D LCD device may be driven by a scan driving mode. However, the scan driving mode causes a luminance value of the 3D stereoscopic image to be decreased. Accordingly, there is a need to enhance a 3D stereoscopic image.

SUMMARY

Exemplary embodiments of the present invention provide a method of driving a display panel capable of improving a display quality of a 3D stereoscopic image by increasing its luminance values and response time.

Exemplary embodiments of the present invention also provide a display apparatus performing the method of driving the display panel.

According to an exemplary embodiment of the present invention, there is provided a method of driving a display panel. In the method, a first sub area and a second sub area of a pixel part are driven in a two-dimensional (2D) image mode, wherein a first luminance difference exists between the first and second sub areas in the 2D image mode. The first sub area and the second sub area of the pixel part are driven in a three-dimensional (3D) image mode, wherein a second luminance difference exists between the first and second sub areas in the 3D image mode, the second luminance difference being smaller than the first luminance difference.

In an exemplary embodiment of the present invention, in the 3D image mode a luminance value of the first sub area of the pixel part is about equal to a luminance value of the second sub area of the pixel part.

In an exemplary embodiment of the present invention, a received image signal may be determined to be for the 2D image mode or the 3D image mode and a first vertical start signal and a second vertical start signal may be generated based on the determined image mode.

In an exemplary embodiment of the present invention, when driving the first sub area and the second sub area of the pixel part in the 2D image mode, a first sub gate signal having a high level and a low level may be generated based on the first vertical start signal having the high level and the low level. A data voltage may be charged into a first liquid crystal (LC) capacitor and a second LC capacitor in response to the first vertical start signal of the high level, wherein the first LC capacitor is disposed in the first sub area of the pixel part and the second LC capacitor is disposed in the second sub area of the pixel part. A second sub gate signal having the high level and the low level may be generated based on the second vertical start signal having the high level and the low level. The data voltage charged in the second LC capacitor may be partially discharged in response to the second vertical start signal of the high level.

In an exemplary embodiment of the present invention, when driving the first sub area and the second sub area of the pixel part in the 3D image mode, a first sub gate signal having a high level and a low level may be generated based on the first vertical start signal having the high level and the low level. A data voltage capacitor may be charged into a first LC capacitor and a second LC capacitor in response to the first vertical start signal of the high level, wherein the first LC capacitor is disposed in a first sub area of the pixel part and the second LC capacitor is disposed in a second sub area of the pixel part. A second sub gate signal of the low level may be generated based on the second vertical start signal of the low level. The data voltage charged in the second LC capacitor may be held in response to the second vertical start signal of the low level.

In an exemplary embodiment of the present invention, the data voltage is blocked from being charged to the first and second LC capacitors during a frame for a black image signal, wherein the frame for the black image signal occurs between frames in which left-eye and right-eye image signals are processed.

According to an exemplary embodiment of the present invention, there is provided a method of driving a display panel. In the method, a data voltage is charged into each of first and second LC capacitors of a pixel part during a first period of a frame in a 2D image mode or a 3D image mode. The data voltage charged in the second LC capacitor may be partially discharged during a second period of the frame in the 2D image mode, or held during the second period of the frame in the 2D image mode.

The method may further include blocking the data voltage, during a frame for a black image signal, from being charged into the first and second LC capacitors in the 3D image mode, wherein the frame for the black image signal occurs between frames in which left eye and right eye image signals are processed.

According to an exemplary embodiment of the present invention, a display apparatus includes a display panel and a panel driving part. The display panel includes a plurality of pixel parts, wherein a first pixel part includes a first sub area and a second sub area. The panel driving part drives the first sub area to have a first luminance value and the second sub area to have a second luminance value in a 2D image mode, and drives the first and second sub areas to have equal luminance values in a 3D image mode.

In an exemplary embodiment of the present invention, the first pixel part may include a first LC capacitor disposed in the first sub area and connected to a data line and an n-th gate line (wherein, n is a natural number) through a first switching element, a second LC capacitor disposed in the second sub area and connected to the data line and the n-th gate line through a second switching element, and a down capacitor connected to the second LC capacitor and an (n+1)-th gate line through a third switching element, and dividing a voltage charged in the second LC capacitor through the third switching element.

In an exemplary embodiment of the present invention, the panel driving part may include a timing control part generating a first vertical start signal and a second vertical start signal based on an image mode of an image signal, a gate driving part including a first sub gate circuit generating a first sub gate signal based on the first vertical start signal and a second sub gate circuit generating a second sub gate signal based on the second vertical start signal, and a data driving part converting the image signal into a data voltage. Wherein the first sub gate signal is applied to the n-th gate line, the second sub gate signal is applied to the (n+1)-th gate line, and the data voltage is applied to the data line.

In an exemplary embodiment of the present invention, the timing control part may generate the first and second vertical start signals having a high level and a low level in the 2D image mode, and may generate the first vertical start signal having the high level and the low level and the second vertical start signal having the low level in the 3D image mode.

In an exemplary embodiment of the present invention, the first vertical start signal is delayed with respect to the second vertical start signal in the 2D image mode.

In an exemplary embodiment of the present invention, the timing control part may generate a first clock signal and a second clock signal different from the first clock signal to provide the first and second clock signals to the first sub gate circuit, and generate a third clock signal and a fourth clock signal different from the third clock signal to provide the third and fourth clock signals to the second sub gate circuit.

In an exemplary embodiment of the present invention, the first sub gate circuit may generate the first sub gate signal having the high level and the low level based on the first vertical start signal in the 2D and 3D image modes.

In an exemplary embodiment of the present invention, the second sub gate circuit may generate the second sub gate signal having the high level and the low level based on the second vertical start signal in the 2D image mode, and may generate the second sub gate signal of the low level based on the second vertical start signal in the 3D image mode.

In an exemplary embodiment of the present invention, the high level of each of the first and second sub gate signals may be about the same as a high level of each of the first, second, third and fourth clock signals.

In an exemplary embodiment of the present invention, each of the first and second sub gate circuits may receive an off voltage, and the low level of each of the first and second sub gate signals may be about the same as the off voltage.

In an exemplary embodiment of the present invention, the timing control part may receive a left-eye image signal and a right-eye image signal in the 3D image mode.

In an exemplary embodiment of the present invention, the timing control part may receive a first left-eye image signal during an N-th (wherein, N is a natural number) frame, a second left-eye image signal during an (N+1)-th frame, a first right-eye image signal during an (N+2)-th frame and a second right-eye image signal during an (N+3)-th frame in the 3D image mode.

In an exemplary embodiment of the present invention, the timing control part may receive a left-eye image signal, a right-eye image signal and a black image signal in the 3D image mode.

In an exemplary embodiment of the present invention, the timing control part may receive the left-eye image signal during an N-th (wherein, N is a natural number) frame, the black image signal during an (N+1)-th frame, and the right-eye image signal during an (N+2)-th frame in the 3D image mode.

In an exemplary embodiment of the present invention, the data driving part may block the data voltage, which corresponds to the black image signal, from being applied to the data line.

According to an exemplary embodiment of the present invention, a method of driving a display panel includes driving a first sub area of a pixel part with a high luminance value during a first period and a second period of a frame in a 2D image mode; driving a second sub area of the pixel part with the high luminance value during the first period of the frame in the 2D image mode and with a low luminance value during the second period of the frame in the 2D image mode; and driving the first and second sub areas of the pixel part with the high luminance value during first and second periods of a frame in a 3D image mode.

In an exemplary embodiment of the present invention, a black data voltage may not be output to the display panel while the first and second sub areas of the pixel part are driven in the 3D image mode.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be explained in detail with reference to the accompanying drawings.

Figure 1:
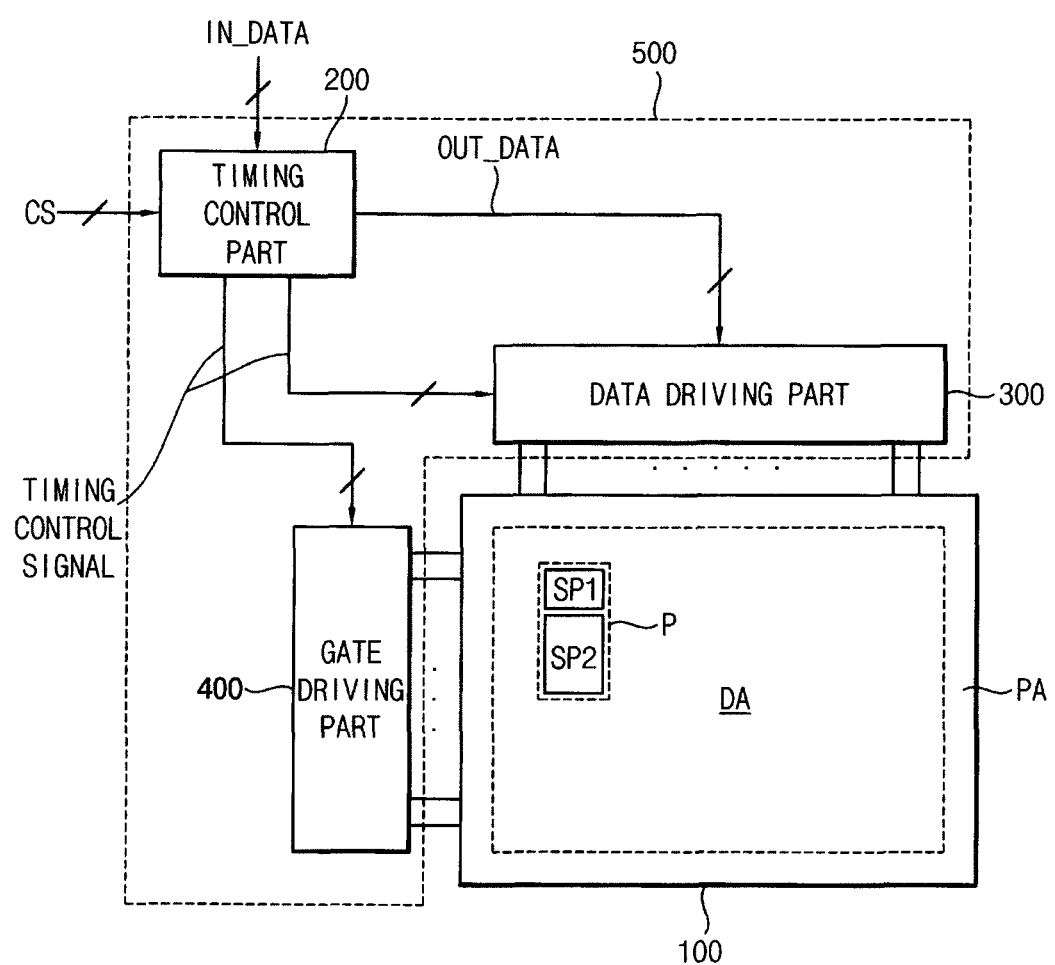
FIG. 1 is a block diagram illustrating a display apparatus according to an exemplary embodiment of the present invention.
Figure 2:
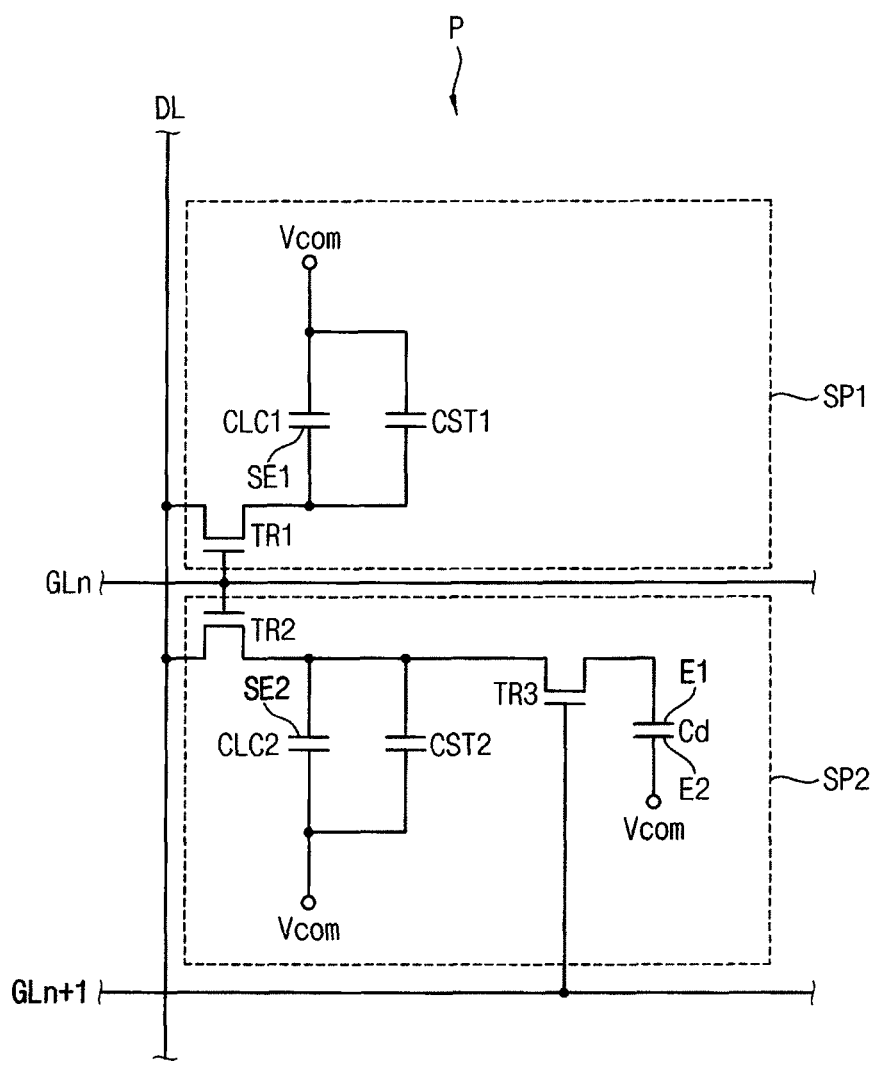
FIG. 2 is an equivalent circuit diagram illustrating a pixel part of FIG. 1, according to an exemplary embodiment of the present invention.

FIG. 1 is a block diagram illustrating a display apparatus according to an exemplary embodiment of the present invention. FIG. 2 is an equivalent circuit diagram illustrating a pixel part of FIG. 1, according to an exemplary embodiment of the present invention.

Referring to FIGS. 1 and 2, the display apparatus includes a display panel 100 and a panel driving part 500. The panel driving part 500 includes a timing control part 200, a data driving part 300 and a gate driving part 400.

The display panel 100 may include a display area DA and a peripheral area PA surrounding the display area DA. A plurality of pixel parts P is disposed on the display area DA and each of the pixel parts P includes a plurality of sub areas SP1 and SP2. The data driving part 300 and the gate driving part 400 such as a chip type or a tape carrier package (TCP) type may be mounted on the peripheral area PA.

The panel driving part 500 drives the display panel 100 in a two-dimensional (2D) image mode and a three-dimensional (3D) image mode. The panel driving part 500 drives the display panel 100 to have a first luminance difference between the plurality of sub areas SP1 and SP2 of the pixel part P in the 2D image mode and drives the display panel 100 to have a second luminance difference between the plurality of sub areas SP1 and SP2 of the pixel part P in the 3D image mode. The second luminance difference is smaller than the first luminance difference. However, the second luminance difference may be the same as the first luminance difference or greater than the first luminance difference.

For example, referring to FIG. 2, each pixel part P includes a first switching element TR1, a first liquid crystal (LC) capacitor CLC1, a first storage capacitor CST1, a second switching element TR2, a second LC capacitor CLC2, a second storage capacitor CST2, a third switching element TR3 and a down capacitor Cd. A pixel area of the pixel part P may include a first sub area SP1 in which the first LC capacitor CLC1 is disposed and a second sub area SP2 in which the second LC capacitor CLC2 is disposed. The first sub area SP1 may also include the first storage capacitor CST1 and the first switching element TR1. The second sub area SP2 may also include the second storage capacitor CST2, the down capacitor Cd, the second switching element TR2 and the third switching element TR3.

The first switching element TR1 is connected to an n-th gate line GLn (wherein, n is a natural number), a data line DL and a first sub electrode SE1 of the first LC capacitor CLC1. The second switching element TR2 is connected to the n-th gate line GLn, the data line DL and a second sub electrode SE2 of the second LC capacitor CLC2. The third switching element TR3 is connected to an (n+1)-th gate line GLn+1, the second sub electrode SE2 of the second LC capacitor CLC2 and a first electrode E1 of the down capacitor Cd. The other electrodes of the first and second LC capacitors CLC1 and CLC2 and a second electrode E2 of the down capacitor Cd may be connected to a reference voltage Vcom.

During a first period during which a first sub gate signal of a high level is applied to the n-th gate line GLn, the first and second switching elements TR1 and TR2 are turned on. The first and second switching elements TR1 and TR2 provide a data voltage applied to the data line DL to the first sub electrode SE1 of the first LC capacitor CLC1 and the second sub electrode SE2 of the second LC capacitor CLC2. After the first period, during a second period in which a second sub gate signal of the high level is applied to the (n+1)-th gate line GLn+1, the third switching element TR3 is turned on so that the data voltage applied to second sub electrode SE2 of the second LC capacitor CLC2 is partially shared by the down capacitor Cd. Thus, in the second period, the data voltage stays charged in the first LC capacitor CLC1, but a voltage lower than the data voltage in the first LC capacitor CLC1 is present in second LC capacitor CLC2. Therefore, in the second period, the first sub area SP1 of the pixel part P has a first luminance value and the second sub area SP2 of the pixel part P has a second luminance value lower than the first luminance value. In other words, the pixel part P is driven to be divided into the first sub area SP1 of a high luminance and the second sub area SP2 of a low luminance. The first and second sub areas SP1 and SP2 may be different sizes as shown in FIG. 1, the same size or the first sub area SP1 may be larger than the second sub area SP2. Further, the second sub area SP2 may be disposed in the top part of the pixel part P, while the first sub area SP1 is disposed in the bottom part of the pixel part P.

The timing control part 200 generates a timing control signal based on a control signal CS received from an external device to control the data driving part 300 and the gate driving part 400. The timing control part 200 receives an image signal IN_DATA and provides the image signal as OUT_DATA to the data driving part 300 based on the control signal CS.

The control signal CS may include a vertical synchronization signal, a horizontal synchronization signal, a dot clock signal, a 3D enable signal, etc. The 3D enable signal may have a high level when the image signal IN_DATA is for the 2D image mode and have a low level when the image signal IN_DATA is for the 3D image mode.

The timing control signal may include a first vertical start signal STV1, a second vertical start signal STV2, a first clock signal CPV1, a second clock signal CPV2, a third clock signal CPV3, a fourth clock signal CPV4, etc. The timing control part 200 makes the second vertical start signal STV2 based on the 3D enable signal. For example, the second vertical start signal STV2 is generated as an alternating signal having a high level and a low level in a frame period in the 2D image mode identified by the 3D enable signal, and is generated as a direct signal having the low level in the 3D image mode identified by the 3D enable signal.

The data driving part 300 converts the image signal OUT_DATA into a data voltage of the analog type based on the timing control signal and outputs the data voltage to the display panel 100. The data voltage may have a positive polarity or a negative polarity with respect to a reference voltage, for example, the reference voltage Vcom.

The gate driving part 400 generates a plurality of first sub gate signals and a plurality of second sub gate signals based on the timing control signal. The gate driving part 400 generates the first sub gate signals using the first vertical start signal STV1, the first clock signal CPV1 and the second clock signal CPV2, and generates the second sub gate signals using the second vertical start signal STV2, the third clock signal CPV3 and the fourth clock signal CPV4. In the 2D image mode, the gate driving part 400 generates each of the first and second sub gate signals having a high level and a low level in response to each of the first and second vertical start signals STV1 and STV2 having a high level and a low level. In the 3D image mode, the gate driving part 400 generates the first sub gate signals in response to the first vertical start signal STV1 having the high level and the low level, and generates the second sub gate signals of the low level in response to the second vertical start signal STV2 of the low level.

Figure 3:
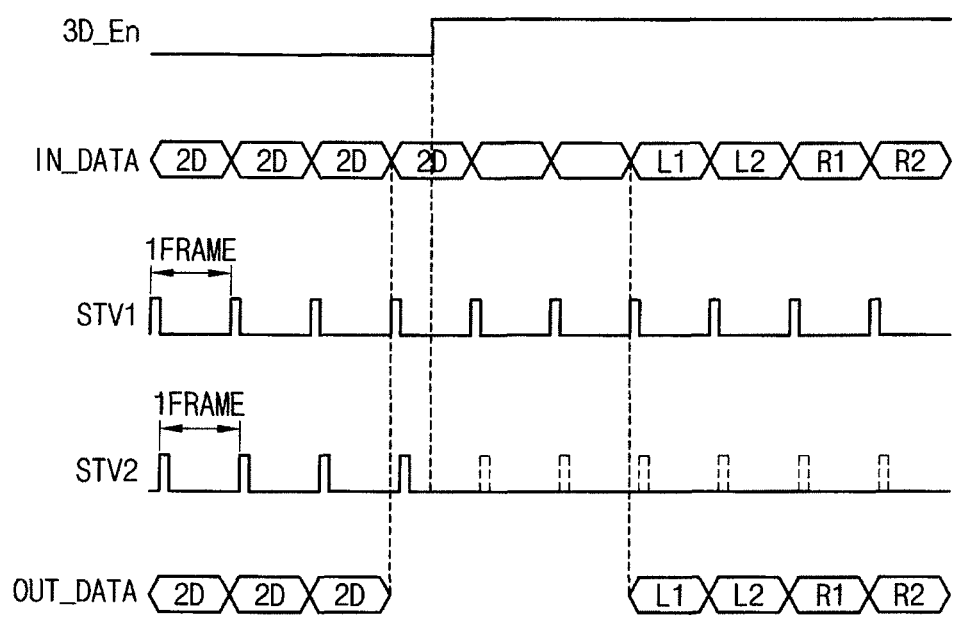
FIG. 3 is a timing diagram illustrating input and output signals of a timing control part of FIG. 1, according to an exemplary embodiment of the present invention.

FIG. 3 is a timing diagram illustrating input and output signals of the timing control part 200 of FIG. 1, according to an exemplary embodiment of the present invention.

Referring to FIGS. 1 and 3, the timing control part 200 receives the 3D enable signal 3D_En (as the control signal CS) and the image signal IN_DATA.

The 3D enable signal 3D_En is a signal for identifying whether the image signal IN_DATA is for the 2D image mode or the 3D image mode. When the image signal IN_DATA is for the 3D image mode, the image signal IN_DATA includes a left-eye image signal L1, a left-eye image signal L2, a right-eye image signal R1 and a right-eye image signal R2 received with a driving frequency of 240 Hz. Herein, the 3D image mode is driven with the driving frequency of 240 Hz, and the driving frequency may be set variously. For example, the driving frequency of the 3D image mode may be set at 360 Hz, 180 Hz or 120 Hz.

The timing control part 200 generates the timing control signal corresponding to the present image signal IN_DATA based on the 3D enable signal 3D_En.

When the 3D enable signal 3D_En has the low level, the timing control part 200 determines the image signal IN_DATA is a 2D image signal and generates the timing control signal for the 2D image mode. The timing control signal of the 2D image mode may include the first vertical start signal STV1 and the second vertical start signal STV2. The first vertical start signal STV1 for the 2D image mode is an alternating signal having a frame period. The second vertical start signal STV2 for the 2D image mode is an alternating signal having a frame period, but is delayed with respect to the first vertical start signal STV1.

When the 3D enable signal 3D_En has the high level, the timing control part 200 determines the image signal IN_DATA is a 3D image signal and generates the timing control signal for the 3D image mode. The timing control signal of the 3D image mode may include the first vertical start signal STV1 and the second vertical start signal STV2. The first vertical start signal STV1 for the 3D image mode is substantially the same as the first vertical start signal STV1 for the 2D image mode (e.g., the alternating signal having the frame period). The second vertical start signal STV2 for the 3D image mode is different from that of the 2D image mode as it is a direct signal of the low level.

After a preset period, which may begin, for example, when the 3D_En signal transitions from low to high, the timing control part 200 outputs the left-eye image signal L1, the left-eye image signal L2, the right-eye image signal R1 and the right-eye image signal R2 as OUT_DATA to the data driving part 300 with the driving frequency of 240 Hz based on the 3D enable signal 3D_En.

Figure 4:
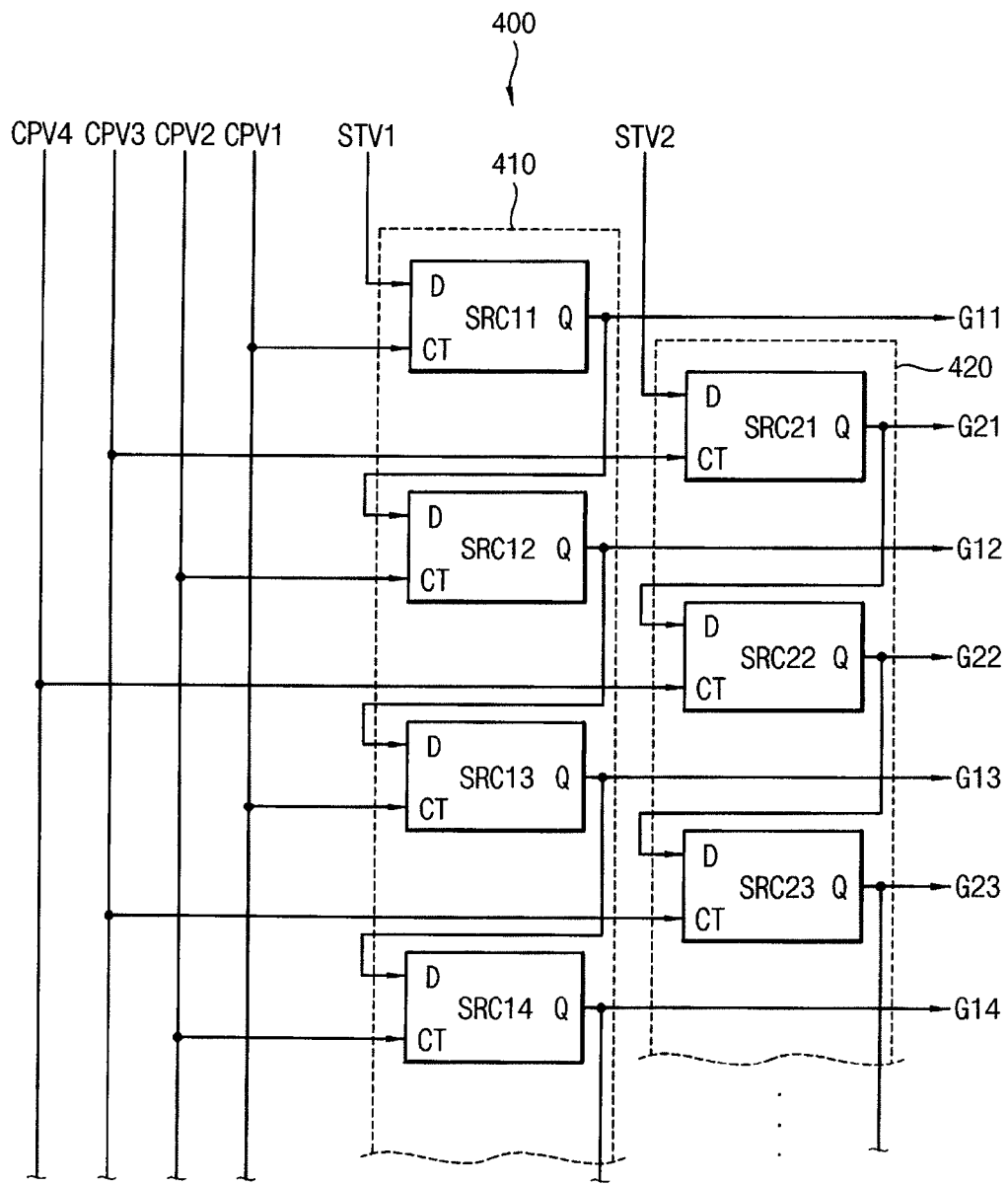
FIG. 4 is a block diagram illustrating a gate driving part of FIG. 1, according to an exemplary embodiment of the present invention.

FIG. 4 is a block diagram illustrating the gate driving part 400 of FIG. 1, according to an exemplary embodiment of the present invention.

Referring to FIGS. 1 and 4, the gate driving part 400 includes a first sub gate circuit 410 and a second sub gate circuit 420. The first and second sub gate circuits 410 and 420 may disposed in the gate driving part 400 or on the peripheral area PA of the display panel 100.

The first sub gate circuit 410 includes a plurality of stages SRC11, SRC12, SRC13, SRC14, . . . and receives the first vertical start signal STV1, the first clock signal CPV1 and the second clock signal CPV2.

Each of the stages SRC11, SRC12, SRC13, SRC14, . . . includes an input terminal D, a clock terminal CT and an output terminal Q, and may be a Data Flip Flop (D-FF). Each of the stages SRC11, SRC12, SRC13, SRC14, . . . may be implemented as other delay type circuits. The input terminal D receives the first vertical start signal STV1 or an output signal of a previous stage. The clock terminal CT receives the first clock signal CPV1 or the second clock signal CPV2. For example, odd-numbered stages SRC11, SRC13, . . . receive the first clock signal CPV1 and even-numbered stages SRC12, SRC14, . . . receive the second clock signal CPV2. The first clock signal CPV1 may have a delay difference with respect to the second clock signal CPV2 and may be the same as or different from the second clock signal CPV2. The output terminal Q outputs a gate signal G11, G12, G13, G14, . . . in synchronization with the first or the second clock signal CPV1 or CPV2.

The second sub gate circuit 420 includes a plurality of stages SRC21, SRC22, SRC23, . . . and receives the second vertical start signal STV2, the third clock signal CPV3 and the fourth clock signal CPV4.

Each of the stages SRC21, SRC22, SRC23, . . . includes an input terminal D, a clock terminal CT and an output terminal Q, and may be a Data Flip Flop (D-FF). Each of the stages SRC21, SRC22, SRC23, . . . may be implemented as other delay type circuits.

The input terminal D receives the second vertical start signal STV2 or an output signal of a previous stage. The clock terminal CT receives the third clock signal CPV3 or the fourth clock signal CPV4. For example, odd-numbered stages SRC21, SRC23, . . . receive the third clock signal CPV3 and even-numbered stages SRC22, . . . receive the fourth clock signal CPV4. The third clock signal CPV3 may have a delay difference with respect to the first and second clock signals CPV1 and CPV2 and may be different from the first and second clock signals CPV1 and CPV2. The third clock signal CPV3 may be the same as one or both of the first and second clock signals CPV1 and CPV2. The third clock signal CPV3 may have a delay difference with respect to the fourth clock signal CPV4 and may be the same as or different from the fourth clock signal CPV4. The fourth clock signal CPV4 may be the same as one or both of the first and second clock signals CPV1 and CPV2. The output terminal Q outputs a gate signal G21, G22, G23, . . . in synchronization with the third or the fourth clock signal CPV3 or CPV4.

Figure 5A:
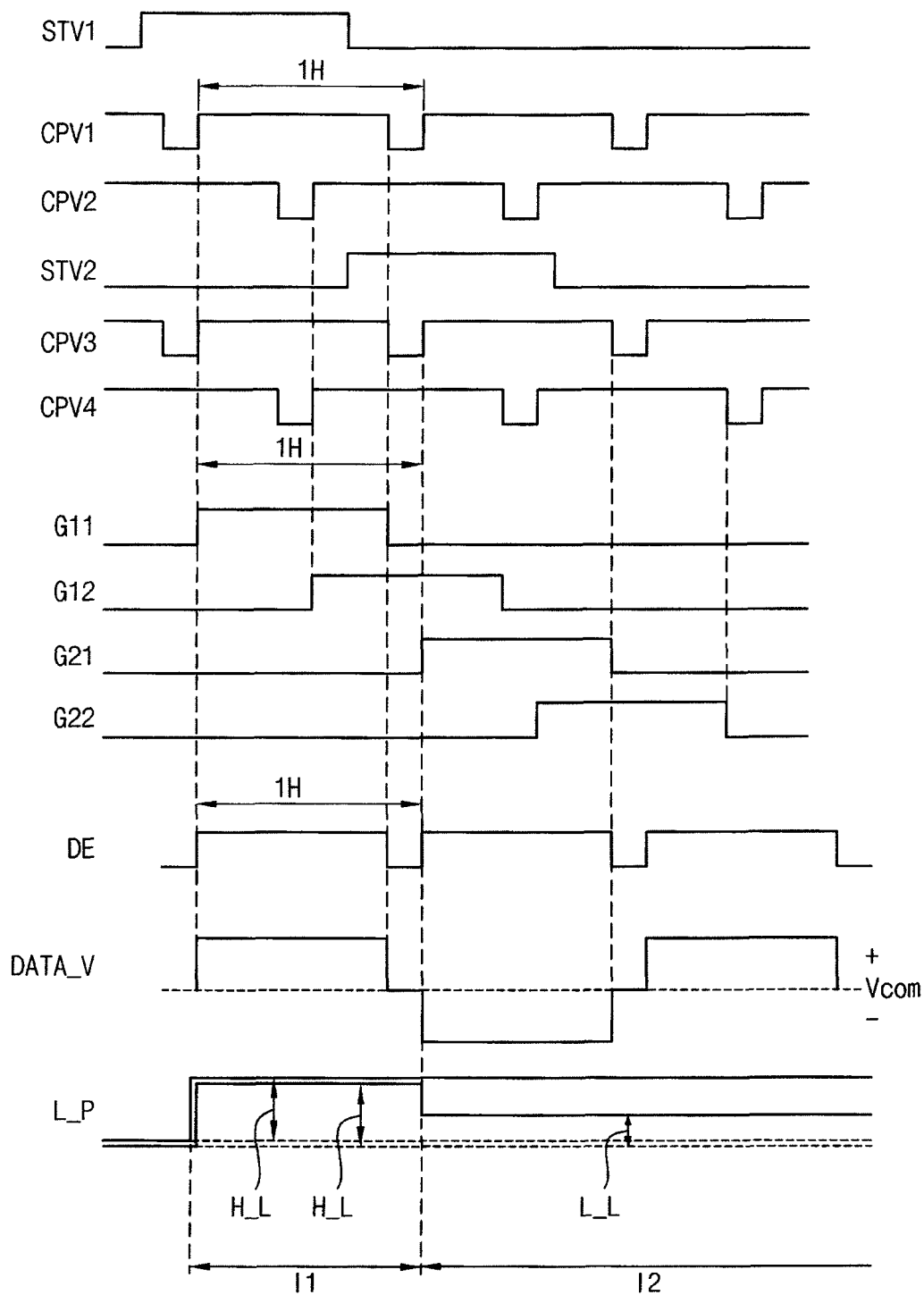
FIGS. 5A and 5B are timing diagrams illustrating a method of driving a display panel of FIG. 1, according to an exemplary embodiment of the present invention.
Figure 5B:
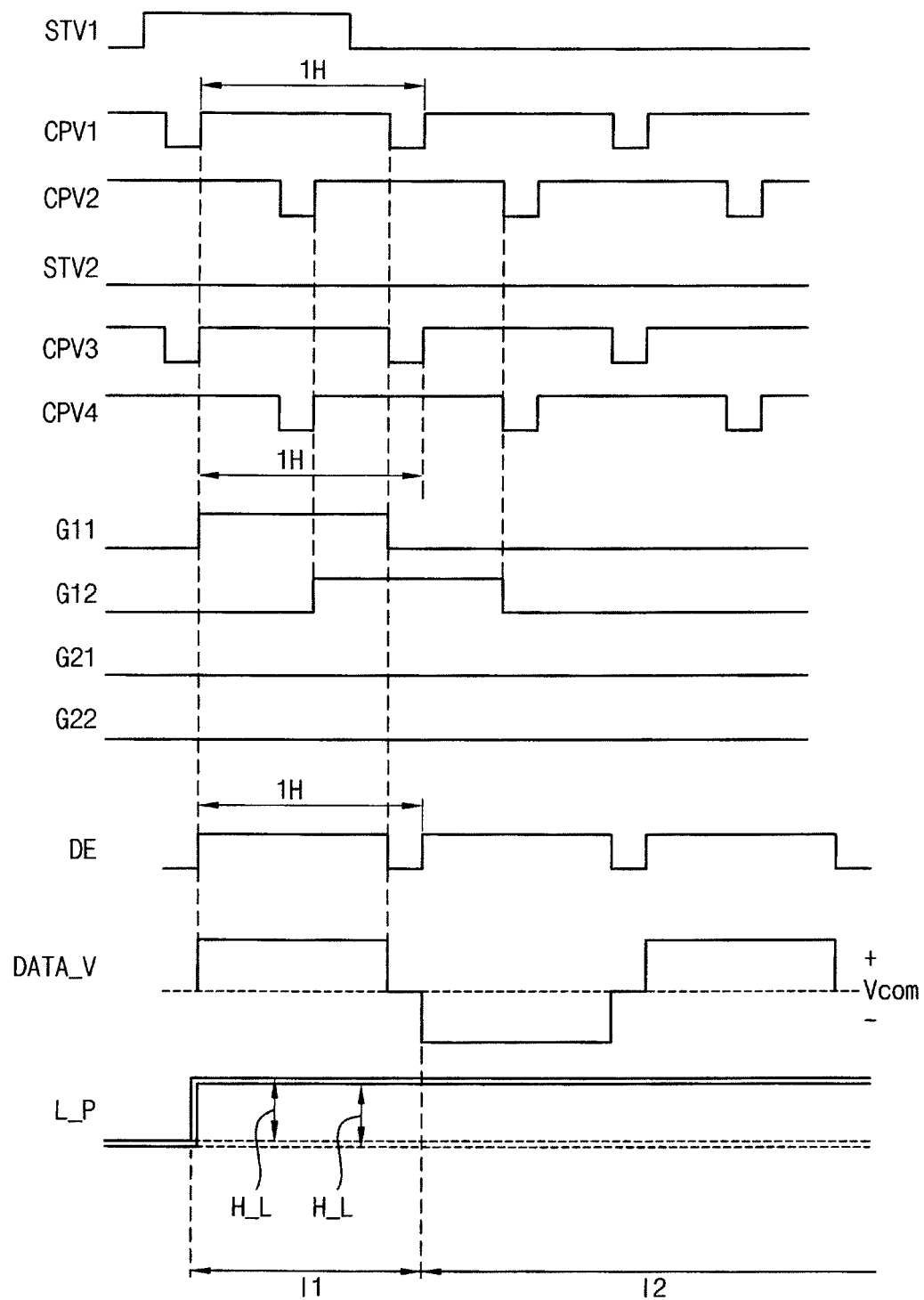

FIGS. 5A and 5B are timing diagrams illustrating a method of driving the display panel 100 of FIG. 1, according to an exemplary embodiment of the present invention. More specifically, FIG. 5A illustrates a method of driving the display panel 100 in the 2D image mode and FIG. 5B illustrates a method of driving the display panel 100 in the 3D image mode.

Referring to FIGS. 2, 4 and 5A, in the 2D image mode, the timing control part 200 generates a timing control signal for the 2D image mode based on the control signal CS. The timing control signal for the 2D image mode includes the first vertical start signal STV1, the second vertical start signal STV2, the first clock signal CPV1, the second clock signal CPV2, the third clock signal CPV3, the fourth clock signal CPV4, data enable signal DE, etc.

The timing control part 200 provides the image signal OUT_DATA to the data driving part 300 in synchronization with the data enable signal DE every 1 horizontal period (1H). The data driving part 300 converts the image signal OUT_DATA into the data voltage DATA_V of the analog type and provides the data voltage DATA_V to the data line DL every 1 horizontal period (1H). The data voltage DATA_V may have a positive polarity (+) or a negative polarity (−) opposite to the positive polarity (+) with respect to a reference voltage Vcom.

The first vertical start signal STV1, the first clock signal CPV1 and the second clock signal CPV2 are provided to the first sub gate circuit 410, and the second vertical start signal STV2, the third clock signal CPV3 and the fourth clock signal CPV4 are provided to the second sub gate circuit 420.

For example, the first vertical start signal STV1 is received in the input terminal D of the first stage SRC11 and the first clock signal CPV1 is received in the clock terminal CT of the first stage SRC11. The first stage SRC11 outputs a gate signal G11 in synchronization with the first clock signal CPV1 in response to the first vertical start signal STV1 of the high level. The gate signal G11 of the first stage SRC11 is received in the input terminal D of the second stage SRC12 and the second clock signal CPV2 is received in the clock terminal CT of the second stage SRC12. The second stage SRC12 outputs a gate signal G12 in synchronization with the second clock signal CPV2 in response to the gate signal G11. As described above, the first sub gate circuit 410 sequentially outputs the gate signals G11, G12, . . . . Each of the gate signals G11, G12, . . . is the first sub gate signal applied to the n-th gate line GLn of the pixel part P.

In response to the first sub gate signal being applied to the n-th gate line GLn of the pixel part P, the first switching element TR1 of the first sub area SP1 and the second switching element TR2 of the second sub area SP2 connected to the n-th gate line GLn are turned on. The data voltage DATA_V is applied the data line DL, provided to the first sub electrode SE1 of the first LC capacitor CLC1 and the second sub electrode SE2 of the second LC capacitor CLC2 and charged in the first and second LC capacitors CLC1 and CLC2. In other words, the data voltage DATA_V is charged in the first and second LC capacitors CLC1 and CLC2 during a first period I1 of the frame so that the first and second sub areas SP1 and SP2 of the pixel part P have a first luminance value H_L corresponding to the data voltage DATA_V. It is noted that L_P in FIGS. 5A and 5B refers to the luminance value of the pixel part P.

After this, the second vertical start signal STV2 is received in the input terminal D of the first stage SRC21, and the third clock signal CPV3 is received in the clock terminal CT of the first stage SRC21. The first stage SRC21 outputs a gate signal G21 in synchronization with the third clock signal CPV3 in response to the high level of the second vertical start signal STV2. The gate signal G21 of the first stage SRC21 is received in the input terminal D of the second stage SRC22 and the fourth clock signal CPV4 is received in the clock terminal CT of the second stage SRC22. The second stage SRC22 outputs a gate signal G22 in synchronization with the fourth clock signal CPV4 in response to the gate signal G21. As described above, the second sub gate circuit 420 sequentially outputs the gate signals G21, G22, . . . . Each of the gate signals G21, G22, . . . is the second sub gate signal applied to the (n+1)-th gate line GLn+1 of the pixel part P.

In response to the second sub gate signal being applied to the (n+1)-th gate line GLn+1 of the pixel part P, the third switching element TR3 connected to the (n+1)-th gate line GLn+1 is turned on. This causes the data voltage DATA_V applied the second sub electrode SE2 of the second LC capacitor CLC2 to be partially shared with the down capacitor Cd. Thus, a voltage lower than the data voltage DATA_V is applied to the second LC capacitor CLC2. In other words, the data voltage DATA_V is partially discharged from the second LC capacitor CLC2 during a second period I2 of the frame so that the second sub area SP2 has a second luminance value H_L lower than the first luminance value H_L.

Referring to FIGS. 2, 4 and 5B, in the 3D image mode, the timing control part 200 generates a timing control signal for the 3D image mode based on the control signal CS. The timing control signal for the 3D image mode includes the first vertical start signal STV1, the second vertical start signal STV2, the first clock signal CPV1, the second clock signal CPV2, the third clock signal CPV3, the fourth clock signal CPV4, the data enable signal DE, etc. The second vertical start signal STV2 for the 3D image mode is the direct signal having the low level.

The timing control part 200 provides the image signal OUT_DATA to the data driving part 300 in synchronization with the data enable signal DE every 1 horizontal period (1H). The data driving part 300 converts the image signal OUT_DATA into the data voltage DATA_V of the analog type and provides the data voltage DATA_V to the data line DL every 1 horizontal period (1H).

The first vertical start signal STV1, the first clock signal CPV1 and the second clock signal CPV2 are provided to the first sub gate circuit 410, and the second vertical start signal STV2, the third clock signal CPV3 and the fourth clock signal CPV4 are provided to the second sub gate circuit 420.

A method of driving the pixel part P with the first sub gate circuit 410 is substantially the same as that described in FIG. 5A and thus any repetitive detailed explanation will be omitted. Therefore, during a first period I1 of a frame in the 3D image mode, the first and second sub areas SP1 and SP2 of the pixel part P have a first luminance value H_L corresponding to the data voltage DATA_V.

However, a method of driving the pixel part P by applying the second vertical start signal STV2 that is the direct signal of the low level during a second period I2 of the frame in the 3D image mode is different as follows.

The second vertical start signal STV2 is received in the input terminal D of the first stage SRC21 and the third clock signal CPV3 is received in the clock terminal CT of the first stage SRC21. The second vertical start signal STV2 of the low level is applied to the first stage SRC21 so that the first stage SRC21 is not substantially driven to output a gate signal G21 of the low level. The gate signal G21 of the low level outputted from the first stage SRC21 is received in the input terminal D of the second stage SRC22 and the fourth clock signal CPV4 is received in the clock terminal CT of the second stage SRC22. The gate signal G21 of the low level is applied to the second stage SRC22 so that the second stage SRC22 is not substantially driven to output a gate signal G22 of the low level. As described above, the second sub gate circuit 420 sequentially outputs the gate signals G21, G22, . . . of the low level. Each of the gate signals G21, G22, . . . of the low level is the second sub gate signal that is provided to the (n+1)-th gate line GLn+1 of the pixel part P.

In response to second sub gate signal of the low level being applied to the (n+1)-th gate line GLn+1 of the pixel part P, the third switching element TR3 connected to the (n+1)-th gate line GLn+1 is turned off. The third switching element TR3 is turned off so that the data voltage DATA_V charged in the second LC capacitor CLC2 will not be shared with the down capacitor Cd. Thus, the data voltage DATA_V is held in the second LC capacitor CLC2 during the second period I2 of the frame. In other words, the data voltage DATA_V in the second LC capacitor CLC2 is about the same during the first and second periods I1 and I2 of the frame. Therefore, in the second period I2, the second sub area SP2 may have the same luminance value as the first luminance value H_L of the first sub area SP1.

According to the exemplary embodiment of the present invention described above, in the 3D image mode, the second LC capacitor CLC2 of the pixel part P is not discharged so that the sub area SP2 may have the same luminance value as that of the first sub area SP1. Therefore, a luminance value of a 3D stereoscopic image may be improved.

Table 1 includes measured data illustrating a luminance value of a full white image when a 3D image is displayed on the display panel 100 with the driving frequency of 240 Hz.

TABLE 1

|  | A condition when an alternating signal is used as STV2 | A condition when STV2 according to the above described exemplary embodiment of the present invention is used |
|---|---|---|
| A luminance value of a full white image | 520 nit | 560 nit |

Referring to Table 1, when the second vertical start signal STV2 is the alternating signal, which is the same as that used for the 2D image mode, the luminance value of the full white image is about 520 nit in the 3D image mode. However, when the second vertical start signal STV2 is the direct signal of the low level according to the above described exemplary embodiment of the present invention, the luminance value of the full white image is about 560 nit in the 3D image mode. When the second vertical start signal STV2 is the direct signal of the low level, the data voltage charged in the second LC capacitor CLC2 is not shared with the down capacitor Cd. Thus, in the 3D image mode, the second sub area SP2 may have the same luminance value as the luminance value of the first sub area SP1. Therefore, the luminance value of a 3D stereoscopic image may be improved.

Table 2 includes measured data illustrating rising and falling times of the LC when a 3D image is displayed on the display panel 100 with the driving frequency of 240 Hz.

TABLE 2

| A response time of Gray to Gray (range of 0 to 48 gray-scales) | The condition when the alternating signal is used as STV2 (Rising time/falling time) | The condition when STV2 according to the above described exemplary embodiment is used (Rising time/falling time) |
|---|---|---|
| 0 to 16 | 25.5 ms/2.87 ms | 25.2 ms/2.7 ms |
| 0 to 24 | 17.3 ms/2.7 ms | 16.7 ms/2.8 ms |
| 0 to 32 | 17.0 ms/2.9 ms | 13.9 ms/3.0 ms |
| 0 to 40 | 17.7 ms/3.0 ms | 11.5 ms/3.1 ms |
| 0 to 48 | 15.0 ms/3.2 ms | 9.2 ms/3.4 ms |

The measured data of the Table 2 does not apply an over-driving technique for improving the response time of the LC.

Referring to Table 2, when the second vertical start signal STV2 is the alternating signal, a rising time during which the LC changes from 0 gray to 16 gray is about 25.5 ms, and a falling time during which the LC changes from 16 gray to 0 gray is about 2.87 ms. A rising time during which the LC changes from 0 gray to 24 gray is about 17.3 ms, and a falling time during which the LC changes from 24 gray to 0 gray is about 2.7 ms. A rising time during which the LC changes from 0 gray to 32 gray is about 17.0 ms, and a falling time during which the LC changes from 32 gray to 0 gray is about 2.9 ms. A rising time during which the LC changes from 0 gray to 40 gray is about 17.7 ms, and a falling time during which the LC changes from 40 gray to 0 gray is about 3.0 ms. A rising time during which the LC changes from 0 gray to 48 gray is about 15.0 ms, and a falling time during which the LC changes from 48 gray to 0 gray is about 3.2 ms.

However, when the second vertical start signal STV2 is the direct signal of the low level according to the above described exemplary embodiment of the present invention, a rising time during which the LC changes from 0 gray to 16 gray is about 25.2 ms, and a falling time during which the LC changes from 16 gray to 0 gray is about 2.7 ms. A rising time during which the LC changes from 0 gray to 24 gray is about 16.7 ms, and a falling time during which the LC changes from 24 gray to 0 gray is about 2.8 ms. A rising time during which the LC changes from 0 gray to 32 gray is about 13.9 ms, and a falling time during which the LC changes from 32 gray to 0 gray is about 3.0 ms. A rising time during which the LC changes from 0 gray to 40 gray is about 11.5 ms, and a falling time during which the LC changes from 40 gray to 0 gray is about 3.1 ms. A rising time during which the LC changes from 0 gray to 48 gray is about 9.2 ms, and a falling time during which the LC changes from 48 gray to 0 gray is about 3.4 ms.

As described above, the response time of the LC may be improved by the above described exemplary embodiment of the present invention. Particularly, the rising response time may be improved by about 17%.

Figure 6:
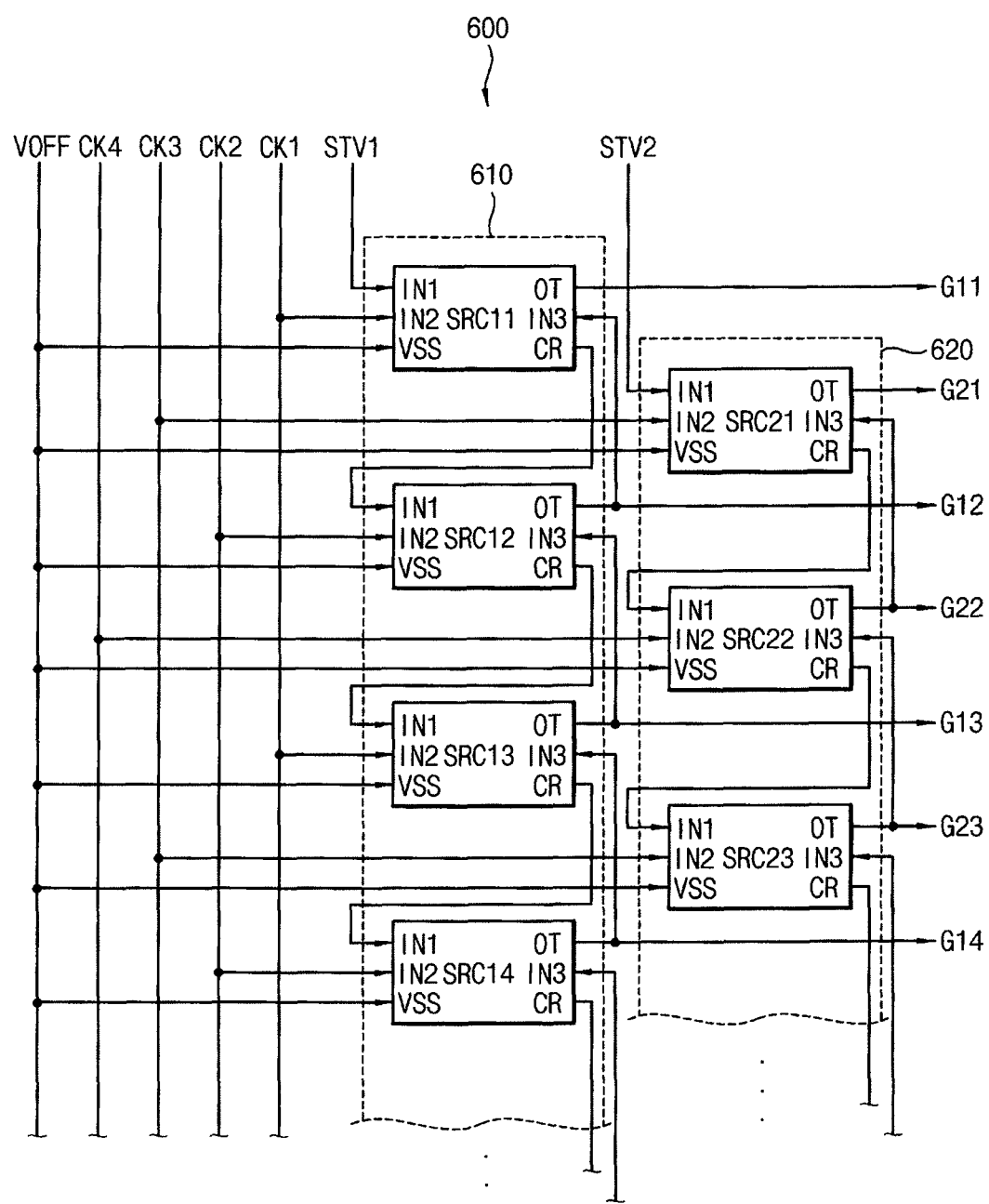
FIG. 6 is a block diagram illustrating a gate driving part according to an exemplary embodiment of the present invention.

FIG. 6 is a block diagram illustrating a gate driving part of a display apparatus according to an exemplary embodiment of the present invention.

Referring to FIGS. 1 and 6, the gate driving part 600 includes a first sub gate circuit 610 and a second sub gate circuit 620. The first and second sub gate circuits 610 and 620 may be disposed on the peripheral area PA of the display panel 100. The first and second sub gate circuit 610 and 620 may be disposed in the gate driving part 600. The first and second sub gate circuits 610 and 620 include a plurality of transistors that may be formed via a process that is substantially the same as that for forming the first, second and third switching elements TR1, TR2 and TR3 disposed on the display area DA of the display panel 100.

The first sub gate circuit 610 includes a plurality of stages SRC11, SRC12, SRC13, SRC14, . . . , and receives a first vertical start signal STV1, an off voltage VOFF, a first clock signal CK1 and a second clock signal CK2.

Each of the stages SRC11, SRC12, SRC13, SCR14, . . . may include a first input terminal IN1, second input terminal IN2, third input terminal IN3, voltage terminal VSS, output terminal OT and a carry terminal CR. The first input terminal IN1 receives the first vertical start signal STV1 or a carry signal of a previous stage. The second input terminal IN2 receives the first clock signal CK1 or the second clock signal CK2. For example, odd-numbered stages SRC11, SRC13, . . . receive the first clock signal CK1 and even-numbered stages SRC12, SRC14, . . . receive the second clock signal CK2. The first clock signal CK1 is different from the second clock signal CK2. In other words, the first clock signal CK1 may have the same frequency as that of the second clock signal CK2 but a delay difference with respect to the second clock signal CK2. The third input terminal IN3 receives a gate signal of the following stage. The voltage terminal VSS receives the off voltage VOFF to provide a gate signal G11, G12, G13, . . . a low level. The output terminal OT outputs the gate signal G11, G12, G13, . . . in synchronization with the first or second clock signal CK1 or CK2. The carry terminal CR outputs a carry signal in synchronization with the gate signal G11, G12, G13, . . . .

The second sub gate circuit 620 includes a plurality of stages SRC21, SRC22, SRC23, . . . and receives the second vertical start signal STV2, the off voltage VOFF, a third clock signal CK3 and a fourth clock signal CK4.

Each of the stages SRC21, SRC22, SRC23, . . . may include a first input terminal IN1, a second input terminal IN2, a third input terminal IN3, a voltage terminal VSS, an output terminal OT and carry terminal CR. The first input terminal IN1 receives the second vertical start signal STV2 or a carry signal of a previous stage. The second input terminal IN2 receives the third clock signal CK3 or the fourth clock signal CK4. For example, odd-numbered stages SRC21, SRC23, . . . receive the third clock signal CK3 and even-numbered stages SRC24, . . . receive the fourth clock signal CK4. The third clock signal CK3 is different from the fourth clock signal CK4. In other words, the third clock signal CK3 may have the same frequency as that of the second clock signal CK2 but a delay difference with respect to the fourth clock signal CK4.

The third input terminal IN3 receives a gate signal of the following stage. The voltage terminal VSS receives the off voltage VOFF to provide a gate signal G21, G22, G23, . . . a low level. The output terminal OT outputs the gate signal G21, G22, G23, . . . in synchronization with the third or fourth clock signal CK3 or CK4. The carry terminal CR outputs a carry signal in synchronization with the gate signal G21, G22, G23, . . . .

Figure 7A:
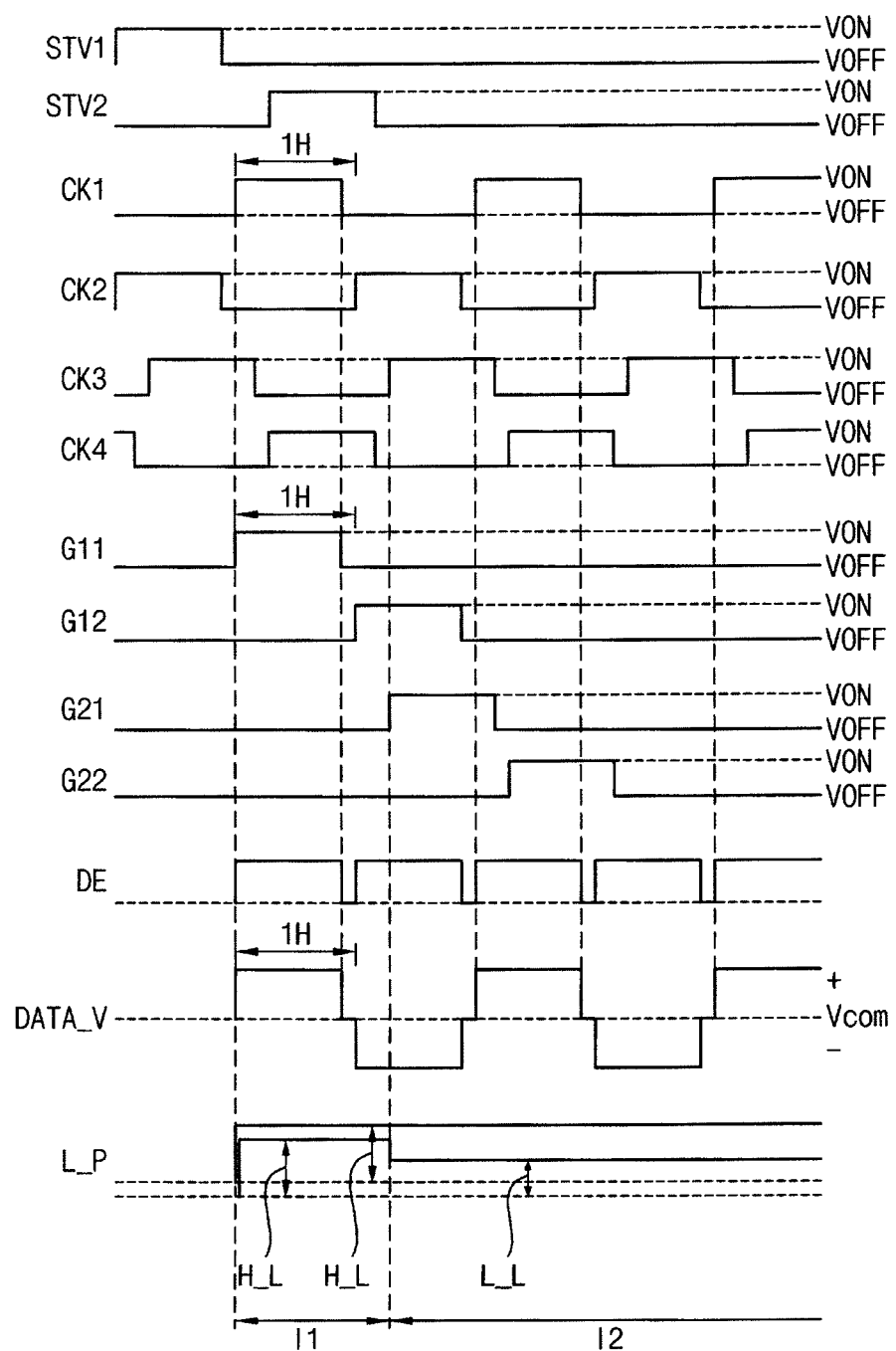
FIGS. 7A and 7B are timing diagrams illustrating a method of driving a display panel with the gate driving part of FIG. 6, according to an exemplary embodiment of the present invention.
Figure 7B:
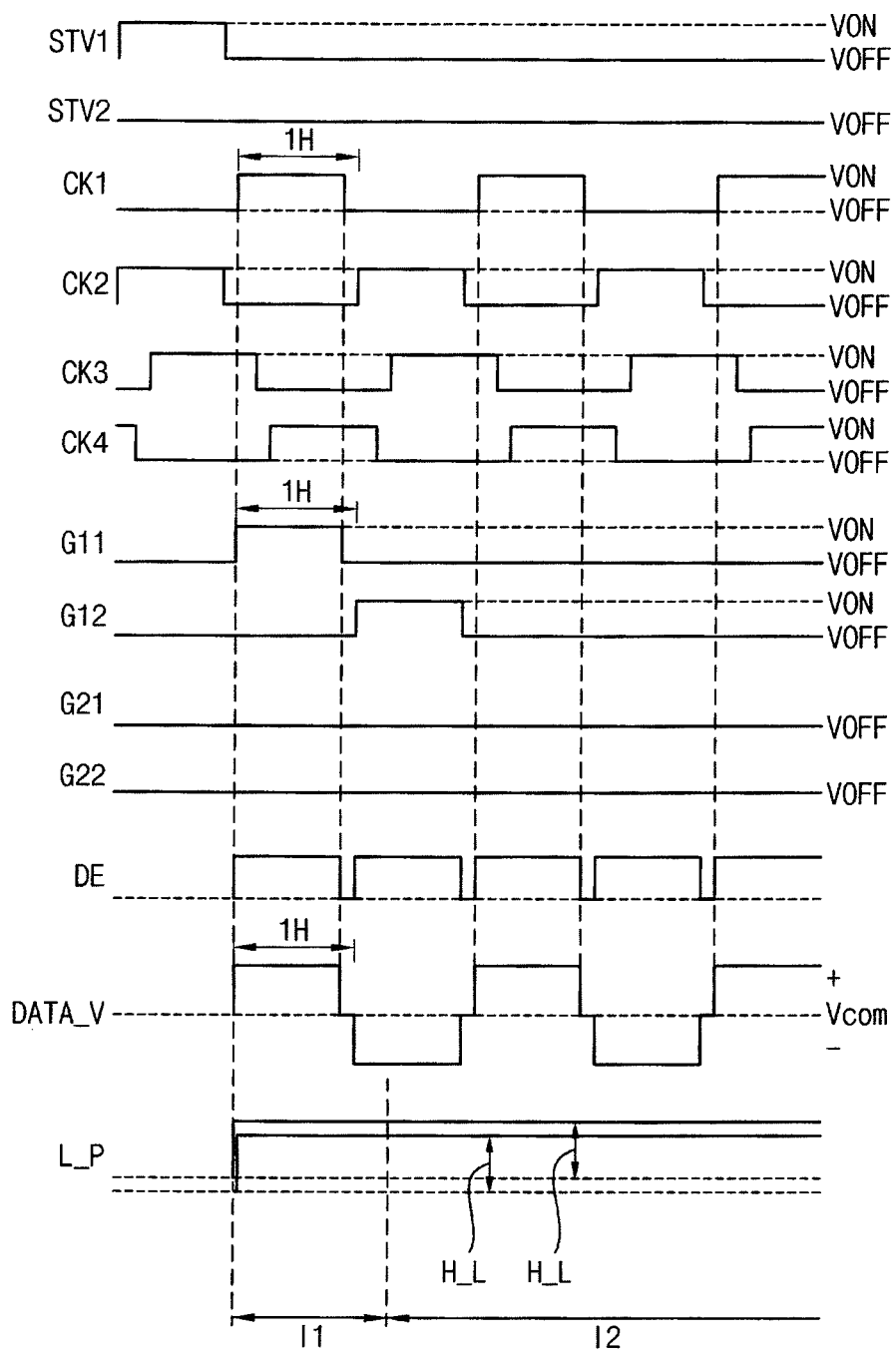

FIGS. 7A and 7B are timing diagrams illustrating a method of driving a display panel with the gate driving part 600 of FIG. 6, according to an exemplary embodiment of the present invention. More specifically, FIG. 7A illustrates a method of driving the display panel in the 2D image mode and FIG. 7B illustrates a method of driving the display panel in the 3D image mode.

Referring to FIGS. 2, 6 and 7A, in the 2D image mode, the timing control part 200 generates a timing control signal for the 2D image mode based on the control signal CS. The timing control signal for the 2D image mode includes the first vertical start signal STV1, the second vertical start signal STV2, the first clock signal CK1, the second clock signal CK2, the third clock signal CK3, the fourth clock signal CK4, data enable signal DE, etc.

The timing control part 200 provides the image signal OUT_DATA to the data driving part 300 in synchronization with the data enable signal DE every 1 horizontal period (1H). The data driving part 300 converts the image signal OUT_DATA into the data voltage DATA_V of the analog type and provides the data voltage DATA_V to the data line DL every 1 horizontal period (1H). The data voltage DATA_V may have a positive polarity (+) or a negative polarity (−) opposite to the positive polarity (+) with respect to a reference voltage Vcom.

The first vertical start signal STV1, the first clock signal CK1 and the second clock signal CK2 are provided to the first sub gate circuit 610, and the second vertical start signal STV2, the third clock signal CK3 and the fourth clock signal CK4 are provided to the second sub gate circuit 620.

For example, the first vertical start signal STV1 is received in the first input terminal IN1 of the first stage SRC11, the first clock signal CK1 is received in the second input terminal IN2 of the first stage SRC11. The first stage SRC11 outputs a gate signal G11 of a high voltage VON in synchronization with the first clock signal CK1 in response to the first vertical start signal STV1 of the high level. The carry terminal CR of the first stage SRC11 outputs a carry signal in synchronization with the gate signal G11 of the high voltage VON. The third input terminal IN3 of the first stage SRC11 receives a gate signal G12 of a second stage SRC12 and the voltage terminal VSS of the first stage SRC11 receives the off voltage VOFF. The first stage SRC11 discharges the gate signal G11 of the high voltage VON with the off voltage VOFF in response to the gate signal G12 received at the third input terminal IN3. As described above, the first sub gate circuit 610 sequentially outputs the gate signals G11, G12, . . . . Each of the gate signals G11, G12, . . . is the first sub gate signal that is provided to the n-th gate line GLn of the pixel part P.

In response to the first sub gate signal that is provided to the n-th gate line GLn of the pixel part P, the first switching element TR1 of the first sub area SP1 and the second switching element TR2 of the second sub area SP2 connected to the n-th gate line GLn are turned on. The data voltage DATA_V is applied the data line DL, provided to the first sub electrode SE1 of the first LC capacitor CLC1 and the second sub electrode SE2 of the second LC capacitor CLC2 and charged in the first and second LC capacitors CLC1 and CLC2. In other words, the data voltage DATA_V is charged in the first and second LC capacitors CLC1 and CLC2 during a first period I1 of the frame so that the first and second sub areas SP1 and SP2 of the pixel part P have a first luminance value H_L corresponding to the data voltage DATA_V. It is noted that L_P in FIGS. 7A and 7B refers to the luminance value of the pixel part P.

After this, the second vertical start signal STV2 is received in the first input terminal IN1 of the first stage SRC21, and the third clock signal CK3 is received in the second input terminal IN2 of the first stage SRC21. The first stage SRC21 outputs a gate signal G21 of a high voltage VON in synchronization with the third clock signal CK3 in response to the second vertical start signal STV2 of the high level. The carry terminal CR of the first stage SRC21 outputs a carry signal in synchronization with the gate signal G21 of the high voltage VON. The third input terminal IN3 of the first stage SRC21 receives a gate signal G22 of a second stage SRC22 and the voltage terminal VSS of the first stage SRC21 receives the off voltage VOFF. The first stage SRC21 discharges the gate signal G21 of the high voltage VON into the off voltage VOFF in response to the gate signal G22 received at the third input terminal IN3. As described above, the second sub gate circuit 620 sequentially outputs the gate signals G21, G22, . . . . Each of the gate signals G21, G22, . . . is the second sub gate signal that is provided to the (n+1)-th gate line GLn+1 of the pixel part P.

In response to the second sub gate signal that is provided to the (n+1)-th gate line GLn+1 of the pixel part P, the third switching element TR3 connected to the (n+1)-th gate line GLn+1 is turned on. The data voltage DATA_V applied the second sub electrode SE2 of the second LC capacitor CLC2 is partially shared with the down capacitor Cd. Thus, a voltage lower than the data voltage DATA_V is applied to the second LC capacitor CLC2. In other words, the data voltage DATA_V is partially discharged from the second LC capacitor CLC2 during a second period I2 of the frame so that the second sub area SP2 has a second luminance value L_L lower than the first luminance value H_L.

Referring to FIGS. 2, 6 and 7B, in the 3D image mode, the timing control part 200 generates a timing control signal for the 3D image mode based on the control signal CS. The timing control signal for the 3D image mode includes the first vertical start signal STV1, the second vertical start signal STV2, the first clock signal CK1, the second clock signal CK2, the third clock signal CK3, the fourth clock signal CK4, the data enable signal DE, etc. The second vertical start signal STV2 for the 3D image mode is the direct signal having the low level.

The timing control part 200 provides the image signal OUT_DATA to the data driving part 300 in synchronization with the data enable signal DE every 1 horizontal period (1H). The data driving part 300 converts the image signal OUT_DATA into the data voltage DATA_V of the analog type and provides the data voltage DATA_V to the data line DL every 1 horizontal period (1H).

The first vertical start signal STV1, the first clock signal CK1 and the second clock signal CK2 are provided to the first sub gate circuit 610, and the second vertical start signal STV2, the third clock signal CK3 and the fourth clock signal CK4 are provided to the second sub gate circuit 620.

A method of driving the pixel part P with the first sub gate circuit 610 is substantially the same as that described in FIG. 7A and thus any repetitive detailed explanation will be omitted. Therefore, during a first period I1 of a frame in the 3D image mode, the first and second sub areas SP1 and SP2 of the pixel part P have a first luminance value H_L corresponding to the data voltage DATA_V.

However, a method of driving the pixel part P by applying the second vertical start signal STV2 that is the direct signal of the low level during a second period I2 of the frame is different as follows.

The second vertical start signal STV2 is received in the first input terminal IN1 of the first stage SRC21, and the third clock signal CK3 is received in the second input terminal IN2 of the first stage SRC21. The second vertical start signal STV2 of the low level is applied to the first stage SRC21 so that the first stage SRC21 is not substantially driven to output a gate signal G21 and a carry signal of the low level. The carry signal of the low level outputted from the first stage SRC21 is received in the first input terminal IN1 of the second stage SRC22 and the fourth clock signal CK4 is received in the second input terminal IN2 of the second stage SRC22. The carry signal of the low level is applied to the second stage SRC22 so that the second stage SRC22 is not substantially driven to output a gate signal G22 and a carry signal of the low level. As described above, the second sub gate circuit 620 sequentially outputs the gate signals G21, G22, . . . of the low level. Each of the gate signals G21, G22, . . . of the low level is the second sub gate signal that is provided to the (n+1)-th gate line GLn+1 of the pixel part P.

In response to the second sub gate signal that is provided to the (n+1)-th gate line GLn+1 of the pixel part P, the third switching element TR3 connected to the (n+1)-th gate line GLn+1 is turned off. The third switching element TR3 is turned off so that the data voltage DATA_V charged in the second LC capacitor CLC2 is not shared with the down capacitor Cd. Thus, the data voltage DATA_V is held in the second LC capacitor CLC2 during a second period I2 of the frame. In other words, the data voltage DATA_V in the second LC capacitor CLC2 is about the same during the first and second periods I1 and I2 of the frame. Therefore, in the second period I2, the second sub area SP2 may have the same luminance value as the first luminance value H_L of the first sub area SP1.

According to the exemplary embodiment of the present invention described above, in the 3D image mode, the second LC capacitor CLC2 of the pixel part P is not discharged so that the sub area SP2 may have the same luminance value as that of the first sub area SP1. Therefore, a luminance of a 3D stereoscopic image may be improved.

Figure 8:
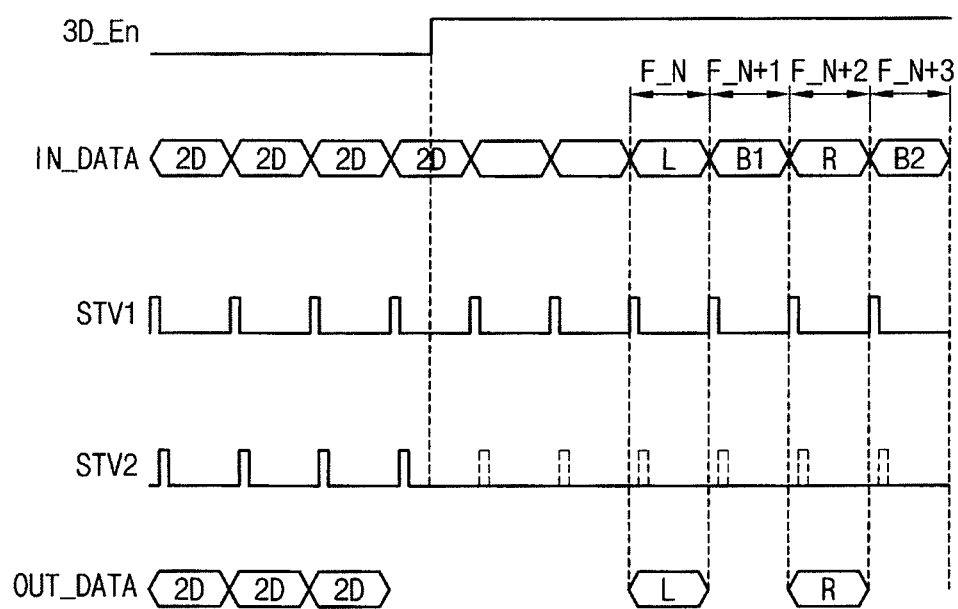
FIG. 8 is a timing diagram illustrating input and output signals of a timing control part according to an exemplary embodiment of the present invention.

FIG. 8 is a timing diagram illustrating input and output signals of the timing control part 200 according to an exemplary embodiment of the present invention.

Referring to FIGS. 1 and 8, the timing control part 200 receives a 3D enable signal 3D_En (as the control signal CS) and an image signal IN_DATA.

In this exemplary embodiment of the present invention, the image signal IN_DATA is for a 3D image and includes a left-eye image signal L, a first black image signal B1, a right-eye image signal R and a second black image signal B2 received with a driving frequency of 240 Hz. However, the image signal IN_DATA may be received and internally driven with various other driving frequencies such as 360 Hz, 180 Hz and 120 Hz, for example.

The timing control part 200 generates a timing control signal corresponding to the present image signal IN_DATA based on the 3D enable signal 3D_En.

When the 3D enable signal 3D_En has a low level, the timing control part 200 determines the image signal IN_DATA is a 2D image signal and generates a timing control signal for a 2D image mode. The timing control signal for the 2D image mode may include a first vertical start signal STV1 and a second vertical start signal STV2. The first vertical start signal STV1 is an alternating signal having a frame period, and the second vertical start signal STV2 is as an alternating signal having a frame period, but is delayed with respect to the first vertical start signal STV1.

When the 3D enable signal 3D_En has a high level, the timing control part 200 determines the image signal IN_DATA is a 3D image signal and generates a timing control signal for a 3D image mode. The timing control signal for the 3D image mode may include a first vertical start signal STV1 and a second vertical start signal STV2. The first vertical start signal STV1 for the 3D image mode is substantially the same as the first vertical start signal STV1 for the 2D image mode (e.g., the alternating signal having the frame period). The second vertical start signal STV2 for the 3D image mode is a direct signal of a low level.

After a preset period, which may begin, for example, when the 3D_En signal transitions from low to high, the timing control part 200 outputs the left-eye and right-eye image signals L and R as OUT_DATA. More specifically, the timing control part 200 outputs the left-eye image signal L during an N-th frame F_N, does not output the first black image signal B1 during an (N+1)-th frame F_N+1, outputs the right-eye image signal R during an (N+2)-th frame F_N+2, and does not output the second black image signal B2 during an (N+3)-th frame F_N+3.

The data driving part 300 converts the image signal OUT_DATA outputted from the timing control part 200 into a data voltage and provides the data voltage to the display panel 100. In the 3D image mode, the data driving part 300 outputs a left-eye data voltage during the N-th frame F_N, does not output a data voltage for a first black image during the (N+1)-th frame F_N+1, outputs a right-eye data voltage during the (N+2)-th frame F_N+2, and does not output a data voltage for a second black image during the (N+3)-th frame F_N+3. In other words, the data driving part 300 blocks the data voltage from the display panel 100 during the (N+1)-th and (N+3)-th frames F_N+1 and F_N+3.

As described above, in the 2D image mode, the gate driving part 400 generates the first and second sub gate signals having the high level during 1 horizontal period (1H) using the first and second vertical start signals STV1 and STV2 of the alternating signal type and provides the first and second sub gate signals to the pixel part P of the display panel 100. In the 3D image mode, the gate driving part 400 generates the first sub gate signal having the high level during 1 horizontal period (1H) using the first vertical start signal STV1 of the alternating signal type and provides the first sub gate signal to the pixel part P of the display panel 100. In addition, the gate driving part 400 generates the second sub gate signal having the low level using the second vertical start signal STV2 of the direct signal type and provides the second sub gate signal to the pixel part P of the display panel 100.

Therefore, the second sub area SP2 of the pixel part P is driven with a luminance higher than that of the 2D image mode during the N-th frame F_N and the (N+2)-th frame F_N+2 so that the luminance of a 3D stereoscopic image may be improved.

Further, the data voltage is not applied to the display panel 100 during the (N+1)-th and (N+3)-th frames F_N+1 and F_N+3 so that the response time of the display panel 100 in the N-th and (N+2)-th frames F_N and F_N+2 may be improved in comparison with that of when a black data voltage, which corresponds to the black image signal, is applied to the display panel 100 during the (N+1)-th and (N+3)-th frames F_N+1 and F_N+3. For example, when the black data voltage is applied to the pixel part P during the (N+1)-th frame F_N+1, the LC arranged by the left-eye data voltage of the N-th frame F_N is rearranged by the black data voltage. After this, when the right-eye data voltage is applied to the pixel part P during the (N+2)-th frame F_N+2, the LC arranged by the black data voltage of the (N+1)-th frame F_N+1 is rearranged by the right-eye data voltage. In this case, the rising response time may be slow. Therefore, the black data voltage is not applied to the pixel part P during the (N+1)-th and (N+3)-th frames F_N+1 and F_N+3 so that the response time may be sped-up.

According to an exemplary embodiment of the present invention, in the 2D image mode, the first sub area SP1 of the pixel part P is driven with a high luminance value and the second sub area SP1 of the pixel part P is driven with a low luminance value, thus giving the pixel part P an uneven luminance. However, in the 3D image mode, the second sub area SP2 is driven with the same or substantially the same luminance value as that used to drive the first sub area SP1, thus giving the pixel part P even luminance. Therefore, a luminance value and a response time of a 3D stereoscopic image may be improved.

In addition, when the 3D image signal includes the left-eye image signal, the first black image signal, the right-eye image signal and the second black image signal, the second sub area SP2 of the pixel part P is driven with the same luminance value as that of the first sub area SP1 of the pixel part P during the left-eye frame or the right-eye frame by blocking the black data voltage from the pixel part P during the first and second black image signal frames. Thus, a luminance value and a response time of a 3D stereoscopic image may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of driving a display panel, the method comprising:
    driving a first sub area and a second sub area of a pixel part in a two-dimensional (2D) image mode, wherein a first luminance difference exists between the first and second sub areas in the 2D image mode; and
    driving the first sub area and the second sub area of the pixel part in a three-dimensional (3D) image mode, wherein a second luminance difference exists between the first and second sub areas in the 3D image mode, the second luminance difference being smaller than the first luminance difference,
    wherein the first sub area includes a first liquid crystal (LC) capacitor connected to a data line and an n-th gate line (wherein, n is a natural number) through a first switching element,
    the second sub area includes a second LC capacitor connected to the data line and the n-th gateline through a second switching element, and the second sub area further includes a down capacitor connected to the second LC capacitor and an n+1-th gate line through a third switching element, and
    a data voltage applied to the second LC capacitor of the second sub area is partially shared with the down capacitor of the second sub area to cause the first luminance difference.

2. The method of claim 1, wherein in the 3D image mode a luminance value of the first sub area of the pixel part is about equal to a luminance value of the second sub area of the pixel part.

3. The method of claim 1, further comprising:
    determining that a received image signal is for the 2D image mode or the 3D image mode; and
    generating a first vertical start signal and a second vertical start signal based on the determined image mode.

4. The method of claim 3, wherein driving the first sub area and the second sub area of the pixel part in the 2D image mode comprises:
    generating a first sub gate signal having a high level and a low level based on the first vertical start signal having the high level and the low level;
    charging the data voltage into the first LC capacitor of the first sub area and the second LC capacitor of the second sub area in response to the first vertical start signal of the high level;
    generating a second sub gate signal having the high level and the low level based on the second vertical start signal having the high level and the low level; and
    partially discharging the data voltage charged in the second LC capacitor of the second sub area in response to the second vertical start signal of the high level.

5. The method of claim 3, wherein driving the first sub area and the second sub area of the pixel part in the 3D image mode comprises:
- generating a first sub gate signal having a high level and a low level based on the first vertical start signal having the high level and the low level;
- charging the data voltage into the first LC capacitor of the first sub area and the second LC capacitor of the second sub area in response to the first vertical start signal of the high level;
- generating a second sub gate signal of the low level based on the second vertical start signal of the low level; and
- holding the data voltage charged in the second LC capacitor of the second sub area in response to the second vertical start signal of the low level.

6. The method of claim 5, wherein the data voltage is blocked from being charged into the LC capacitors during a frame for a black image signal, wherein the frame for the black image signal occurs between frames in which left-eye and right-eye image signals are processed.

7. A method of driving a display panel, the method comprising:
- charging a data voltage into each of first and second liquid crystal (LC) capacitors of a pixel part during a first period of a frame in a two-dimensional (2D) image mode or a three-dimensional (3D) image mode; and
- partially discharging the data voltage charged in the second LC capacitor into a down capacitor during a second period of the frame in the 2D image mode, or holding the data voltage charged in the second LC capacitor during the second period of the frame in the 3D image mode,
- wherein the first LC capacitor is disposed in a first sub area of the pixel part and is connected to a data line and an n-th gate line (wherein, n is a natural number) through a first switching element,
- the second LC capacitor is disposed in a second sub area of the pixel part and is connected to the data line and the n-th gate line through a second switching element, and
- the down capacitor is disposed in the second sub area and is connected to the second LC capacitor and an n+1-th gate line through a third switching element.

8. The method of claim 7, further comprising:
- blocking the data voltage, during a frame for a black image signal, from being charged into the first and second LC capacitors in the 3D image mode, wherein the frame for the black image signal occurs between frames in which left eye and right eye image signals are processed.

9. A display apparatus, comprising:
- a display panel including a plurality of pixel parts, wherein a first pixel part includes a first sub area and a second sub area; and
- a panel driving part driving the first sub area to have a first luminance value and the second sub area to have a second luminance value in a two-dimensional (2D) image mode, and driving the first and second sub areas to have equal luminance values in a three-dimensional (3D) image mode,
- wherein the first pixel part comprises:
- a first liquid crystal (LC) capacitor disposed in the first sub area and connected to a data line and an n-th gate line (wherein, n is a natural number) through a first switching element;
- a second LC capacitor disposed in the second sub area and connected to the data line and the n-th gate line through a second switching element; and
- a down capacitor connected to the second LC capacitor and an n+1-th gate line through a third switching element,
- wherein the down capacitor divides a voltage charged in the second LC capacitor through the third switching element.

10. The display apparatus of claim 9, wherein the panel driving part comprises:
- a timing control part generating a first vertical start signal and a second vertical start signal based on an image mode of an image signal;
- a gate driving part including a first sub gate circuit generating a first sub gate signal based on the first vertical start signal and a second sub gate circuit generating a second sub gate signal based on the second vertical start signal; and
- a data driving part converting the image signal into a data voltage,
- wherein the first sub gate signal is applied to the n-th gate line, the second sub gate signal is applied to the (n+1)-th gate line, and the data voltage is applied to the data line.

11. The display apparatus of claim 10, wherein the timing control part generates the first and second vertical start signals each having a high level and a low level in the 2D image mode, and generates the first vertical start signal having the high level and the low level and the second vertical start signal having the low level in the 31) image mode.

12. The display apparatus of claim 11, wherein the first vertical start signal is delayed with respect to the second vertical start signal in the 2D image mode.

13. The display apparatus of claim 12, wherein the timing control part generates a first clock signal and a second clock signal different from the first clock signal to provide the first and second clock signals to the first sub gate circuit, and generates a third clock signal and a fourth clock signal different from the third clock signal to provide the third and fourth clock signals to the second sub gate circuit.

14. The display apparatus of claim 13, wherein the first sub gate circuit generates the first sub gate signal having the high level and the low level based on the first vertical start signal in the 2D and 3D image modes.

15. The display apparatus of claim 13, wherein the second sub gate circuit generates the second sub gate signal having the high level and the low level based on the second vertical start signal in the 2D image mode, and
- generates the second sub gate signal of the low level based on the second vertical start signal in the 3D image mode.

16. The display apparatus of claim 13, wherein the high level of each of the first and second sub gate signals is about the same as a high level of each of the first, second, third and fourth clock signals.

17. The display apparatus of claim 16, wherein each of the first and second sub gate circuits receives an off voltage, and the low level of each of the first and second sub gate signals is the about same as the off voltage.

18. The display apparatus of claim 10, wherein the timing control part receives a left-eye image signal and a right-eye image signal in the 3D image mode.

19. The display apparatus of claim 18, wherein the timing control part receives a first left-eye image signal during an N-th (wherein, N is a natural number) frame, a second left-eye image signal during an (N+1)-th frame, a first right-eye image signal during an (N+2)-th frame and a second right-eye image signal during an (N+3)-th frame in the 3D image mode.

20. The display apparatus of claim 10, wherein the timing control part receives a left-eye image signal, a right-eye image signal and a black image signal in the 3D image mode.

21. The display apparatus of claim 20, wherein the timing control part receives the left-eye image signal during an N-th (wherein, N is a natural number) frame, the black image signal during an (N+1)-th frame, and the right-eye image signal during an (N+2)-th frame in the 3D image mode.

22. The display apparatus of claim 20, wherein the data driving part blocks the data voltage, which corresponds to the black image signal, from being applied to the data line.

23. A method of driving a display panel, the method comprising:
- driving a first sub area of a pixel part with a high luminance value during a first period and a second period of a frame in a two-dimensional (2D) image mode;
- driving a second sub area of the pixel part with the high luminance value during the first period of the frame in the 2D image mode and with a low luminance value during the second period of the frame in the 2D image mode; and
- driving the first and second sub areas of the pixel part with the high luminance value during first and second periods of a frame in a three-dimensional (3D) image mode,
- wherein a black data voltage is not output to the display panel while the first and second sub areas of the pixel part are driven in the 3D image mode.

* * * * *